Feb. 18, 1969  H. L. CORWIN  3,428,338
MECHANICAL JOINT AND METHOD OF MAKING SAME
Filed Aug. 22, 1966
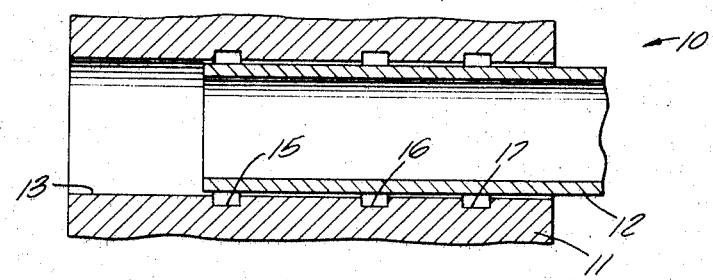
FIG. 1.
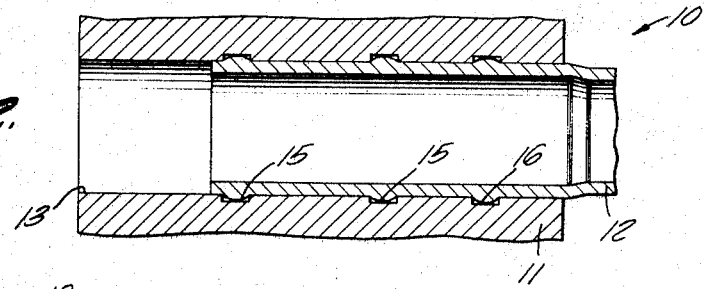
FIG. 2.
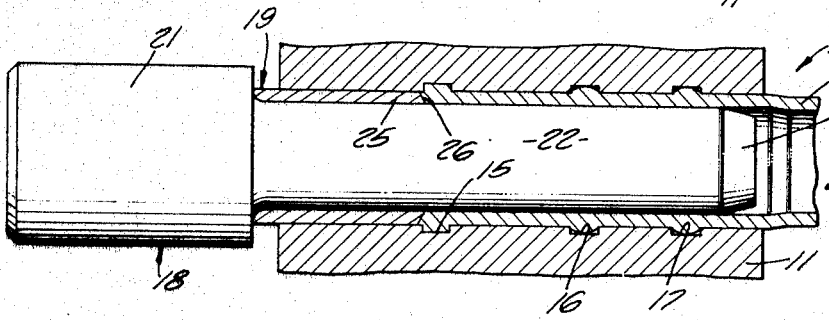
FIG. 3.
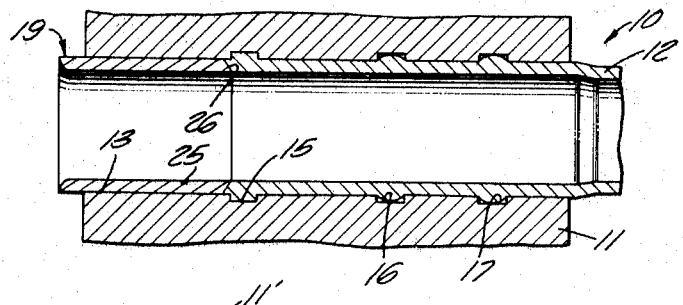
FIG. 4.
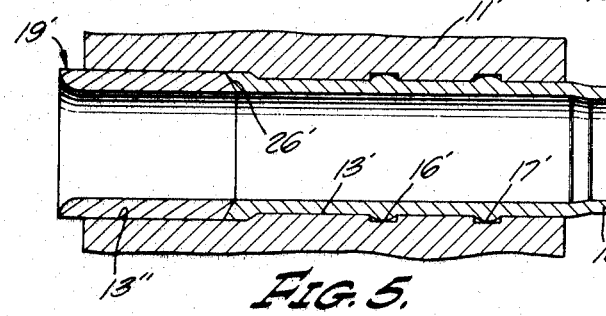
FIG. 5.
HARRY L. CORWIN
INVENTOR.
BY 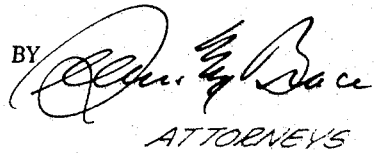
ATTORNEYS

United States Patent Office 3,428,338
Patented Feb. 18, 1969

3,428,338
MECHANICAL JOINT AND METHOD OF MAKING SAME
Harry L. Corwin, Los Angeles, Calif., assignor to Vernon Tool Co., Ltd., Alhambra, Calif., a corporation of California
Filed Aug. 22, 1966, Ser. No. 573,913
U.S. Cl. 285—39                                     7 Claims
Int. Cl. F16l 55/00, 35/00

ABSTRACT OF THE DISCLOSURE

A gasketless fluid-tight heat exchanger joint and method for sealing a tube assembled to a header bore utilizing a hardened sleeve to upset the end of the tube into a fluid-tight mechanical joint with the bore wall and with the advanced end of the sleeve. The latter has a forced frictional fit with the bore wall before assembly and is sized such that its outer end protrudes beyond the bore end after assembly to safeguard the tube and bore ends against erosion.

---

This invention relates to mechanical joints and more particularly to an improved high-strength mechanical joint between components of heat transfer devices such as heat exchangers, boilers and the like, and to a superior method of processing such joints to withstand high temperatures and pressures without need for brazing or welding.

Heat transfer devices operating under high temperatures and pressures are subject to severe strains, stresses and vibrations. In consequence, serious problems are presented in providing failproof, high reliability junctions between the component parts. This is particularly true as respects steam boilers and related types of heat transfer structures having heat exchange tubes connected at their ends to header plates, boiler drums and the like. A particularly common type of joint widely used heretofore employs annular grooves opening through the side walls of tube-seating bores extending through the header plate and into which grooves the tubes are expanded and interlocked. Various techniques are resorted to, to supplement the strength of these mechanical interlocks as well as to provide a fluid seal thereby preventing the entrance of fluids between the tube wall and the seating bore and safeguarding against oxidation of the contacting surfaces or the possibility of fluid leakage therepast.

Despite the use of a wide range of design and assembly techniques, joints of this type continue to present serious problems in that, irrespective of frequent inspections and all precautionary measures, unpredictable failures occur resulting in costly damage to equipment as well as serious personal injuries if not loss of life. One of the more satisfactory joint assembly techniques utilizes a weld between the end of the tube and the adjacent portion of the seating bore wall. Careful study of such joints after periods of use have disclosed that the weld gradually thins through a variety of operating conditions and including in particular erosion-corrosion and wear by reason of the passage of high velocity fluid flow. Furthermore, the welded joint is difficult and costly to make. Additionally, these welds frequently include pin holes which may be closed at the time the joint is completed and therefore escape detection but which become exposed by wear of the weld during normal use of the joint.

Accordingly, it is a primary object of the present invention to provide an improved mechanical joint as well as a superior technique for fabricating the same avoiding the foregoing and other shortcomings of prior designs. The improved joint makes use of one or more annular grooves into which the tube is expanded using principles and practices well known in this art but so arranged that the inner end of the tube is spaced inwardly from the end of the seating bore and preferably opposite a relieved area into which the tube end can be expanded. A tubular sleeve insert of a simple but special construction is then forced into the header plate and against the tube end, as by repeated impact blows effective to upset and expand the end of the tube. The hardened inner end of the sleeve is beveled in a manner to facilitate outward expansion of the tube end. The forcible installation of the sleeve aided by the use of an installation tool designed to support both the sleeve and the tube wall against inward collapse cooperate to provide a fluid-tight mechanical junction between the contacting ends of the sleeve and the tube as well as with the bore capable of withstanding fluid pressures well in excess of those to be encountered in the use of the joint.

Desirably, the insert sleeve is sufficiently long to project outwardly from the end of the bore in the header plate when fully installed. In consequence, extensive wear of the exposed outer end of the sleeve can occur without in any way jeopardizing the strength or effectiveness of the joint.

The sleeve and the impact mandrel with which it is used during fabrication of the joint constitute an installation tool, the sleeve itself forming the sole means for imparting impact and upsetting blows to the tube end. However, as the joint is completed, the upsetting sleeve, being slightly larger in diameter than the bore, is locked in assembled position within the bore and forms part of the completed joint. Accordingly, the sleeve may be considered as a single use, expendable tool component which is convertible into a part of the mechanical joint during its use as an installation tool.

It is therefore a principal object of this invention to provide an improved fluid-type mechanical joint between components of a heat transfer device as well as an improved method of fabricating a joint.

Another object of the invention is the provision of a high-strength mechanical joint between tube ends and a header plate of a heat transfer plate.

Another object of the invention is the provision of an improved mode of assembling a mechanical joint between a tube and a header utilizing an impact tool and wherein a component of the impact tool becomes a permanent part of the joint assembly.

Another object of the invention is the provision of an article of manufacture which is employed initially as a single use upsetting tool and thereafter as a permanent part of a mechanical joint.

These and other more specific objects will appear upon reading the following specification and claims and upon considering in connection therewith the attached drawing to which they relate.

Referring now to the drawing in which a preferred embodiment of the invention is illustrated.

FIGURE 1 is a fragmentary cross-sectional view showing one preferred embodiment of the invention joint during an initial stage of assembly;

FIGURE 2 is a view similar to FIGURE 1 and showing the parts during an intermediate state of assembly;

FIGURE 3 is a view similar to FIGURES 1 and 2 showing the joint during the final phase of the assembly operation;

FIGURE 4 shows the joint after final assembly; and

FIGURE 5 is a fragmentary view through a second preferred embodiment of the invention as finally assembled.

Referring initially to FIGURES 1 to 4, there is shown one preferred embodiment of the invention joint, designated generally 10, including a part only of a header plate 11 and the adjacent end of a single heat transfer tube 12. It will be understood that plate 11 represents a portion of a heat exchanger manifold, a boiler drum or any similar structure commonly made in a great variety of forms for use in supporting and interconnecting the ends of a plurality of heat exchange tubes represented in the drawing by the single tube 12. To this end, header plate 11 is provided with a plurality of closely spaced bores each seating a different one of tube ends 12.

As herein shown, each bore of header 11 is slightly greater in diameter than the external diameter of tubes 12 to facilitate insertion of the latter within the bores. Prior to the assembly operation, each of the bores is provided with a plurality of shallow annular grooves such as those designated 15, 16 and 17.

The assembly procedure for joint 10 comprises inserting tube 12 into the bore to the position shown in FIGURE 1 with the end of the tube terminating slightly to the left of the left hand edge of groove 15. The next operation is to insert any suitable tube expander tool of a type well known to those skilled in this art, such as that disclosed in United States Letters Patent to Walter E. Stary 2,772,716, granted Dec. 4, 1956. This tool includes a long, slightly tapering mandrel arranged to expand against tapering rollers held circumferentially spaced about the mandrel as these rollers are rotated and the mandrel is advanced lengthwise from the left hand end of tube 12, as viewed in FIGURES 1 and 2. The use of the expanded tool enlarges the portion of tube 12 within bore 13 forcing its exterior into high pressure contact with the bore side walls and forces metal of the tube into grooves 15 and 16 thereby forming a positive and powerful mechanical interlock between the tubes and the header plate. The expander tool may be used to either partially or fully fill groove 15 with metal from the inner end of tube 12. Preferably, and as shown in FIGURE 2, the tool has been so used as to only partially fill groove 15.

The next operation is to upset the inner end of tube 12 using a pair of impact tools 18 and 19. Tool 18 comprises a one-piece member having a shouldered head 21 integral with a shank 22 having a chamfered end 23. Shank 22 is sized to have a close sliding fit with impact component 19 as well as within the expanded end of tube 12. Impact tool 19 comprises a cylindrical sleeve which needs to be hardened only at its leading end 25 but which may be uniformly hardened throughout its length in the interest of simplicity of manufacture. The external diameter of this sleeve is made to close tolerances and so as to have a forced fit within bore 13. The leading end 25 of the sleeve is preferably provided with a beveled surface 26 lying at an obtuse angle to the axis of the sleeve, as indicated in FIGURE 3, and is therefore highly effective in expanding the end of tube 12 outwardly and into groove 15 during the final assembly operation. Surface 26 may be formed with annular grooves or ribs effective in providing a labyrinth type seal found to improve the sealing efficiency of the completed assembly.

To complete the assembly and to upset the inner end of tube 12, sleeve 19 is telescoped over shank 22 of impact tool 18. This assembly is then inserted into the left hand end of bore 13. Thereafter, the two abutting impact tools 18, 19 are struck powerful blows gradually forcing the leading end of impact tool 19 into bore 13 and into contact with the inner end of tube 12. At this stage of the operation, tool 19 acts to upset and expand the end of tube 12 into groove 15 whereas shank 22 supports both tool 19 and tube 12 against inward collapse away from the wall of bore 13. As will be evident, the upsetting action performed by the leading end 25 of tool 19 forces the abutting surfaces of the tool and of the tube into exact conformity with one another to form a high-pressure high efficiency fluid seal. The high frictional contact between contacting surfaces of sleeve 19 and bore 13 will hold the sleeve powerfully in this assembled position.

The assembly operation having been completed, tool 18 is withdrawn. The completed joint assembly then has the features illustrated in FIGURE 4, sleeve 19 preferably being sufficiently long as to project for a distance beyond the left hand end of bore 13. Its outer rim edges is also preferably relieved or rounded thereby facilitating the free flow of fluid into or from the tube. Erosion of the outer end of the sleeve will take place over a period of time but this merely wears away portions of sleeve 19 projecting beyond the end of the bore and will in nowise weaken the joint assembly or decrease the strength and sealing power of the mechanical joint. The inner surface of sleeve 19 will also be observed as lying flush with the inner diameter of tube 12 thereby avoiding restriction or interference in any way with the flow of fluid through the tubing.

The modified mechanical joint assembly shown in FIGURE 5 utilizes the same reference characters applied to the same features and parts as in FIGURES 1 to 4 but distinguished therefrom by the addition of a prime. The principal difference between these two joints resides in the fact that FIGURE 5 has a counterbore 13″ at the left end of bore 13′ in lieu of groove 15. Additionally, sleeve element 19′ of the impact tool has a diameter sufficiently larger than the diameter of counterbore 13″ as to have a high strength forced frictional fit therewith.

The joint shown in FIGURE 5 is assembled in essentially the same manner described above in connection with FIGURES 1 to 4 except that tube 12′ is inserted until its inner end projects inwardly beyond the bottom of counterbore 13″ by a substantial distance and, while so positioned, tube 12′ is expanded against the walls of bore 13′ and into grooves 16′, 17′. Thereafter, impact sleeve 19′ is impacted against the end of the tube 12′ upsetting and expanding the end of the latter against the bottom of counterbore 13″. When this has been accomplished the joint is fully assembled and impact mandrel 18 is withdrawn.

While the particular mechanical joint and method of making same herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. In a heat exchanger assembly for use under high-pressure operating conditions and of the type having a header plate supporting one end of a plurality of heat exchange tubes therein, that improvement in a gasketless joint between said header plate and tube end formed solely by metal-to-metal contact between the components of the joint which comprises, a bore through said header plate initially loosely receiving the tube end, said bore having annular groove means in the side wall thereof into which said tube end has been expanded to form a metal-to-metal fluid-tight high-strength mechanical interlock, and a hardened metal sleeve having a driven fit with the bore wall and a flat-surfaced leading end, the included angle between said flat surface and the inner surface of said sleeve being not greater than 90 degrees, said tube having a similarly flat-surfaced outer end portion, said leading end of said sleeve having a driven metal-to-metal mechanical junction with said outer end of said heat exchange tube and serving to protect the end of the latter against corrosion and erosion by fluid flowing through said tube.

2. The invention defined in claim 1 characterized in that the outer end of said sleeve projects outwardly from the end of said bore.

3. The invention defined in claim 1 characterized in that the internal diameter of said sleeve is substantially the same as the internal diameter of the contiguous portion of said heat exchanger tube.

4. The invention defined in claim 1 characterized in that the juxtaposed mating inner ends of said sleeve and heat exchanger tube are at an obtuse angle to the axis of said tube and sleeve and such that axial impact thrusts applied to the outer end of said sleeve act to expand the adjacent end of said tube.

5. That method of forming a gasketless high-strength metal-to-metal fluid-tight joint between a tube and a header plate which comprises, forming a bore through a header plate having a plurality of annular grooves opening thereinto between its opposite ends, inserting a metal ductile heat exchange tube end partially through said bore from one end, expanding said tube end against the bore wall and into interlocking engagement with at least one of said annular grooves, driving a slightly oversize metal sleeve having a flat-surfaced leading end of hardened non-ductile material into the open end of said bore and against the flat surfaced inner end of said tube using repeated impact blows effective to upset the inner end of said tube to form a gasketless metal-to-metal fluid-tight junction between the inner abutting ends of said sleeve and tube.

6. That method defined in claim 5 characterized in that said sleeve has an installed length such that the outer end thereof projects slightly outwardly of the bore end.

7. That method defined in claim 5 characterized in the step of supporting the interior side wall of said tube while installing said sleeve, said support being provided by a mandrel provided with a shank loosely fitting said sleeve and tube and an impact head adapted to transmit impact forces to the outer end of said sleeve as the latter is being driven to its fully installed position.

References Cited

UNITED STATES PATENTS

| 1,512,570 | 10/1924 | Andrews | 285—55 X |
| 2,099,026 | 11/1937 | Markel et al. | 285—213 X |
| 2,557,360 | 6/1951 | Pennella | 285—222 X |
| 2,737,996 | 3/1956 | Toth. | |
| 1,616,893 | 2/1927 | Finch | 285—39 X |

FOREIGN PATENTS

| 154,375 | 12/1953 | Australia. |
| 15,217 | 12/1885 | Great Britain. |
| 12,395 | 3/1901 | Sweden. |

CARL W. TOMLIN, *Primary Examiner.*

DAVE W. AROLA, *Assistant Examiner.*

U.S. Cl. X.R.

285—222, 332, 382.4; 29—157.4, 525